United States Patent
Behm et al.

(10) Patent No.: US 6,510,740 B1
(45) Date of Patent: Jan. 28, 2003

(54) THERMAL MANAGEMENT IN A PRESSURE TRANSMITTER

(75) Inventors: Steven M. Behm, White Bear Lake, MN (US); William B. Krueger, Bloomington, MN (US); Kelly M. Orth, Apple Valley, MN (US); Jeffrey C. Brekken, Richfield, MN (US)

(73) Assignee: Rosemount Inc., Eden Prairie, MN (US)

( * ) Notice: Subject to any disclaimer, the term of this patent is extended or adjusted under 35 U.S.C. 154(b) by 58 days.

(21) Appl. No.: 09/667,399

(22) Filed: Sep. 21, 2000

Related U.S. Application Data (60) Provisional application No. 60/156,369, filed on Sep. 28, 1999.

(51) Int. Cl.[7] .................................................. G01L 19/04
(52) U.S. Cl. ......................................................... 73/708
(58) Field of Search ........................... 73/708, 706, 756

(56) References Cited

U.S. PATENT DOCUMENTS

| 3,701,280 A | 10/1972 | Stroman ..................... 73/194 |
| 3,968,694 A | 7/1976 | Clark ........................ 73/398 |

(List continued on next page.)

FOREIGN PATENT DOCUMENTS

| DE | 0 268 742 | 6/1988 |
| DE | 37 41 648 A1 | 7/1988 |
| DE | 91 09 176.4 | 10/1991 |
| DE | 197 45 244 A1 | 10/1997 |
| DE | 299 03 260 U1 | 5/2000 |
| EP | 0 063 685 A1 | 11/1982 |
| EP | 0 167 941 | 6/1985 |
| EP | 0 214 801 A1 | 3/1987 |
| EP | 0 223 300 A2 | 5/1987 |
| EP | 0 639 039 A1 | 2/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/671,495, Behm et al., filed Sep. 27, 2000.

U.S. patent application Ser. No. 09/519,781, Neslon et al., filed Mar. 7, 2000.

U.S. patent application Ser. No. 09/520,292, Davis et al., filed Mar. 7, 2000.

U.S. patent application Ser. No. 09/519,912, Nelson et al., filed Mar. 7, 2000.

(List continued on next page.)

*Primary Examiner*—Benjamin R. Fuller
*Assistant Examiner*—Jermaine Jenkins
(74) *Attorney, Agent, or Firm*—Westman, Champlin & Kelly, P.A.

(57) ABSTRACT

A pressure transmitter with a transmitter housing having an outer wall providing thermal resistance. The outer wall extends from an isothermal island at a first end to a heat sink island at a second end. The isothermal island includes a fluid inlet, and pressure and temperature sensors. The heat sink island includes a primary heat load device that is heat sunk to an outer shell of an electrical connector. The connector contacts carry a current controlled by the transmitter, and a portion of the current is conducted by a primary heat load device. A circuit board controls the current to represent the pressure. A high accuracy, temperature compensated current output represents pressure.

33 Claims, 9 Drawing Sheets

U.S. PATENT DOCUMENTS

| | | | |
|---|---|---|---|
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 CD |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/678 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/721 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/706 |
| 5,670,722 A | 9/1997 | Moser et al. | 73/756 |
| 5,710,552 A | 1/1998 | McCoy et al. | 340/870.21 |
| 5,754,596 A | 5/1998 | Bischoff et al. | 375/295 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,988,203 A | 11/1999 | Hutton | 137/597 |
| 6,005,500 A | 12/1999 | Gaboury et al. | 341/43 |
| 6,006,338 A | 12/1999 | Longsdorf et al. | 713/340 |
| 6,038,927 A | 3/2000 | Karas | 73/706 |
| 6,050,145 A | 4/2000 | Olson et al. | 73/706 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,140,952 A | 10/2000 | Gaboury | 341/143 |
| 6,216,172 B1 | 4/2001 | Kolblin et al. | 709/253 |
| 6,233,532 B1 | 5/2001 | Boudreau et al. | 702/89 |
| 6,285,964 B1 | 9/2001 | Babel et al. | 702/121 |

OTHER PUBLICATIONS

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15,2000.

U.S. patent application Ser. No. 09/564,506, Nord et al., filed May 14, 2000.

U.S. patent application Ser. No. 09/667,289, Westfield et al., filed Sep. 22, 2000.

U.S. patent application Ser. No. 09/667,399, Behm et al., filed Sep. 21, 2000.

U.S. patent application Ser. No. 09/671,130, Fandrey et al., filed Sep. 27, 2000.

U.S. patent application Ser. No. 29/120,531, Fandrey et al., filed Mar. 21, 2000.

U.S. patent application Ser. No. 29/120,544, Fandrey et al., filed Mar. 21, 2000.

U.S. patent application Ser. No. 29/120,538, Fandrey et al., filed Mar. 21, 2000.

U.S. patent application Ser. No. 29/120,552, Fandrey et al., filed Mar. 21, 2000.

U.S. patent application Ser. No. 29/120,537, Fandrey et al., filed Mar. 21, 2000.

U.S. patent application Ser. No. 29/120,553, Fandrey et al., filed Mar. 21, 2000.

Product Data Sheet No: 00813–0100–4378, "Model 751 Field Signal Indicator", by Rosemount Inc., Eden Prairie, Minnesota, (1997).

Product Data Sheet No: 00813–0100–4731, "APEX™ Radar Gauge", by Rosemount Inc., Eden Prairie, Minnesota, (1998).

Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.

Product Data Sheet No: 00813–0100–4003, "Model 8800A", by Rosemount Inc., Eden Prairie, Minnesota, (1998).

Product Data Sheet No: 00813–0100–4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No: 00813–0100–4263, "Model 444 Alphaline® Temperature Transmitters", by Rosemount Inc., Eden Prairie, Minnesota, (1997).

Product Data Sheet No: 00813–0100–4769, "Model 3244MV Multivariable Temperature Transmitter with FOUNDATION™ Fieldbus", by Rosemount Inc., Eden Prairie, Minnesota, (1998).

Product Data Sheet No: 00813–0100–4724, "Models 3144 and 3244MV Smart Temperature Transmitters", by Rosemount Inc., Eden Prairie, Minnesota, (1998).

Product Data Sheet No: 00813–0100–4738, "Model 3095FB Multivariable™ Transmitter with Modbus™ Protocol", by Rosemount Inc., Eden Prairie, Minnesota, (1996, 1997).

Product Data Sheet No: 00813–0100–4001, "Model 3051 Digital Pressure Transmitter for Pressure, Flow, and Level Measurement", by Rosemount Inc., Eden Prairie, Minnesota, (1998).

Product Data Sheet No: 00813–0100–4698, "Model 2090F Sanitary Pressure Transmitter", by Rosemount Inc., Eden Prairie, Minnesota, (1998).

Product Data Sheet No: 00813–0100–4690, "Model 2088 Economical Smart Pressure Transmitter", by Rosemount Inc., Eden Prairie, Minnesota, (1998).

Product Data Sheet No: 00813–0100–4592, "Model 2024 Differential Pressure Transmitter", by Rosemount Inc., Eden Prairie, Minnesota, (1987–1995).

Product Data Sheet No: 00813–0100–4360, "Model 1151 Alphaline® Pressure Transmitters", by Rosemount Inc., Eden Prairie, Minnesota, (1998).

Product Data Sheet No: 00813–0100–4458, "Model 1135F Pressure–to–Current Converter", by Rosemount Inc., Eden Prairie, Minnesota, (1983, 1986, 1994).

"Single Chip Senses Pressure and Temperature," *Machine Design,* 64 (1992) May 21, No. 10.

Brochure: "Reduce Unaccounted–For Natural Gas with High–Accuracy Pressure Transmitters," Rosemount Inc. Measurement Division, Eden Prairie, Minnesota, ADS 3073, 5/91, pp. 1–4.

Technical Information Bulletin, "Liquid Level Transmitter Model DB40RL Sanitary Sensor deltapilot," Endress + Hauser, Greenwood, Indiana, 9/92, pp. 1–8.

"The Digitisation of Field Instruments" W. Van Der Dijl, *Journal A,* vol. 32, No. 3, 1991, pp. 62–65.

Specification Summary, "TELETRANS™ 3508–30A Smart Differential Pressure Transmitter," (undated) Bristol Babcock, Inc., Watertown, CT, 06795.

Specification Summary, "TELETRANS™ 3508–10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL Flush––Mount Hydrostatic Pressure Transmitter," Jul. 1992, Rosemount Inc., Eden Prairie, MN 55344.

"Flow Measurement," *Handbook of Fluid Dynamics,* V. Streeter, Editor–in–chief, published by McGraw–Hill Book Company, Inc. 1961, pp. 14–4–14–15.

"Precise Computerized In–Line Compressible Flow Metering," *Flow—Its Measurement and Control in Science and Industry,* vol. 1, Part 2, Edited by R. Wendt, Jr., Published by American Institute of Physics et al, (undated) pp. 539–540.

"A Systems Approach," Dr. C. Ikoku, *Natural Gas Engineering,* PennWell Books, (undated) pp. 256–257.

"Methods for Volume Measurement Using Tank–Gauging Devices Can Be Error Prone," F. Berto, *The Advantages of Hydrostatic Tank Gauging Systems,* undated reprint from *Oil & Gas Journal.*

"Hydrostatic Tank Gauging—Technology Whose Time Has Come," J. Berto, *Rosemount Measurement Division Product Feature,* undated reprint from *INTECH.*

"Pressure Sensors Gauge Tank Level and Fluid Density," *Rosemount Measurement Division Product Feature,* undated reprint from *Prepared Foods* (Copyrighted 1991 by Gorman Publishing Company).

"Low Cost Electronic Flow Measurement System," *Tech Profile,* May 1993, Gas Research Institute, Chicago, IL.

"Development of an Integrated EFM Device for Orifice Meter Custody Transfer Applications," S.D. Nieberle et al., *American Gas Association Distribution/Transmission Conference & Exhibit,* May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering,* Dec. 1992, Bristol Babcock, Inc., Watertown, CT 06795.

"Smart Transmitters Tear Up The Market," C. Polsonetti, *INTECH,* Jul. 1993, pp. 42–45.

"MicroLAN Design Guide", Dallas Semiconductor, Tech Brief No. 1, (undated).

"Bosch CAN Specification Version 2.0", by Robert Bosch GmbH, pp. 1–68 including pp. –1–and –2–, (Sep. 1991).

Product Data Sheet No. 00813–0100–4001, "Digital Pressure Transmitter for Pressure, Flow, and Level Measurement", by Rosemount Inc., (1998).

"Claudius Ptolemy (100?–170? AD)", *M&C News,* 7 pages, (Apr. 1994).

American National Standard , "Hydraulic Fluid Power–Solenoid Piloted Industrial Valves–Interface Dimensions for Electrical Connectors", National Fluid Power Association, Inc., 10 pages, (Aug. 1981).

2 pages downloaded from http://www.interlinkbt.com/PRODUCT/IBT_PROD/DN/CN–DM_PN/EURO–D-P.HTM dated Sep. 15, 2000.

4 pages downloaded from http://www.interlinkbt.com/PRODUCT/IBT_PROD/dn/EUR–CON/euro–fwc.htm dated Sep. 15, 2000.

3 pages from TURCK Cable Standards, by Turck, Inc., Minneapolis, Minnesota.

Copy of International Search Report from Application No. PCT/US01/13993 with international filing date of May 1, 2001.

U.S. application patent Ser. No. 09/862,762, Wang, filed May 21, 2001.

U.S. application patent Ser. No. 09/867,961, Fandrey et al., filed May 30, 2001.

THERMAL MANAGEMENT IN A PRESSURE TRANSMITTER

REFERENCE TO CO-PENDING APPLICATION

This application claims priority benefits from U.S. provisional patent application No. 60/156,369 entitled UNITIZED MODULARITY IN A PROCESS TRANSMITTER filed on Sep. 28, 1999.

BACKGROUND OF THE INVENTION

The present invention relates to pressure transmitters used to measure fluid pressures in industrial fluid processing plants. In particular, the present invention relates to the thermal performance of such pressure transmitters.

Pressure transmitters are known to have undesired output changes when there are changes in process fluid temperature, ambient air temperature or even changes in temperature resulting from rainfall on the transmitter housings. Warm-up errors due to localized internal power dissipation are especially difficult to correct under both transient and steady state thermal conditions.

In high accuracy pressure transmitters, these output changes are controlled electronically by compensating temperature and mechanically by using two-part transmitter housings with relatively large surface areas that are joined with a threaded neck. The threaded neck separates and thermally isolates the pressure sensor and the fluid isolator from the heat generated in a circuit controlling a current output.

High accuracy circuits, sensors, and isolators are becoming more miniaturized. There is a desire for a correspondingly miniaturized, high accuracy transmitter in a single housing without the need for a threaded neck to separate the heat generated by the circuit from the pressure sensor and fluid isolator.

It is difficult, however, to manage thermal problems in such miniature housings where there is less housing surface area to dissipate heat. Problems also arise because the sensor and isolator are much closer to the heat dissipating output circuit components. A method and apparatus are needed that will provide a high accuracy, temperature compensated pressure transmitter in a single miniaturized housing.

SUMMARY OF THE INVENTION

A pressure transmitter in accordance with the present invention includes a miniature transmitter housing with an outer wall providing thermal resistance. The outer wall separates an isothermal island at a first end of the housing from a heat sink thermal island at a second end of the housing.

The isothermal island includes a fluid inlet, a pressure sensor for detecting fluid pressure from the inlet, and a temperature sensor.

The heat sink thermal island includes an electrical connector with an outer shell and a feedthrough with contacts. The heat sink island also includes a primary heat load device that is heat sunk to the outer shell. The contacts carry a current controlled by the transmitter. A major portion of that current is conducted by the primary heat load device under normal operating conditions.

The pressure transmitter controls the current to provide a temperature-compensated, high accuracy representation of the pressure.

DETAILED DESCRIPTION OF THE ILLUSTRATED EMBODIMENTS

In the present invention, a miniature pressure transmitter is provided by creating two thermal islands using a miniature transmitter housing that also serves to provide thermal resistance between the thermal islands. An outer wall of the housing thermally separates the pressure sensor and fluid pressure inlet from a primary heat load device that carries a portion of the output current of the transmitter. The pressure sensor and inlet form one of the thermal islands and include a temperature sensor that is used for measuring the temperature of the pressure sensor so that the measured pressure can be temperature compensated. The other thermal island is a heat sink island created by a heat load device that is heat sunk to the outer shell of an electrical feedthrough connector. A single miniaturized housing is used to house the entire transmitter that provides a high accuracy current output.

In other words, a single miniature housing is used, and no threaded neck is needed between the sensor and the circuit components which generate heat in controlling a high accuracy current output. With the present invention, for example, a single miniature housing can be used for a single inlet transmitter that is approximately 12.4 cm (4.88 inches) high and 6.1 cm (2.4 inches) wide. Further, a single miniature housing can also be used for a dual inlet transmitter that is approximately 11.7 cm (4.6 inches) high and 7.6 cm (3.0 inches) wide.

Figure 1:
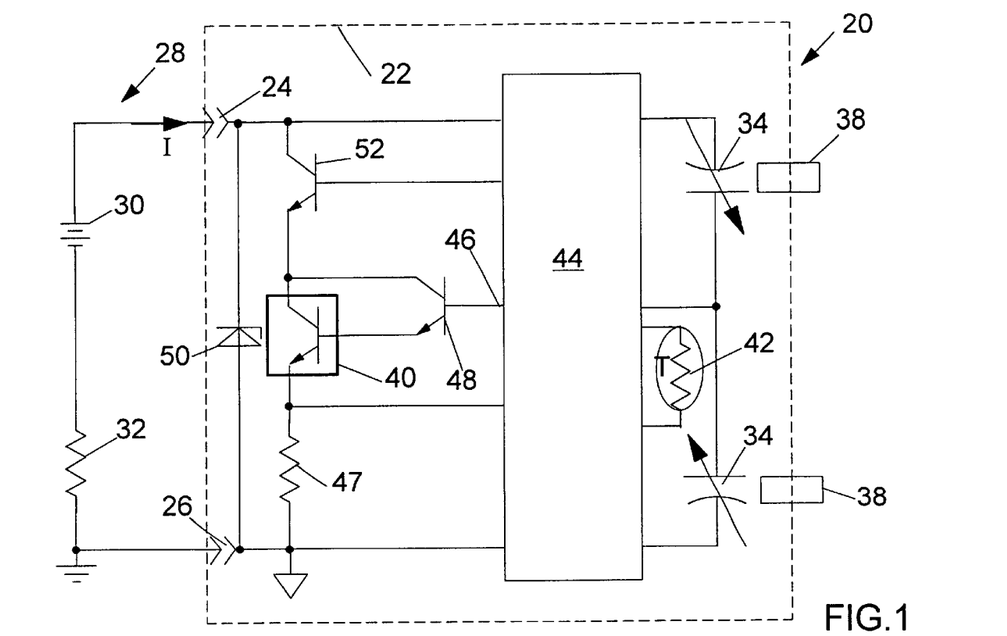
FIG. 1 is a conceptual electrical diagram of a first embodiment of a pressure transmitter.

FIG. 1 schematically illustrates a miniature pressure transmitter 20. Pressure transmitter 20 has a single miniature transmitter housing 22 that encloses both the sensors and circuitry of transmitter 20. Transmitter 20 has one or more inlets 38 that receive one or more pressures at one or more pressure sensors 34. Pressure sensors 34 can be capacitive or piezoresistive pressure sensors. A temperature sensor 42 is thermally coupled to pressure sensor 34 to provide for temperature compensation. Inlets 38, pressure sensor 34 and temperature sensor 42 are thermally coupled together to form an "isothermal island" as explained in more detail in connection with FIGS. 3–9.

Transmitter 20 provides a high accuracy current output I representing pressure at contacts 24, 26. The term "high accuracy" as used in this application means a transmitter that has a total output error of plus or minus 0.4% or better for a plus or minus 28 degree centigrade (plus or minus 50 degree Fahrenheit) change of ambient temperature.

Electrical feedthrough connector contacts 24, 26 are used for connecting transmitter 20 to an external current loop circuit 28 comprising a power supply 30 and a load device 32 that can be a controller or indicator. The current I in loop 28 passes through contacts 24, 26 and can comprise an analog 4–20 mA current with a magnitude controlled by the transmitter 20 to represent pressure. The transmitter can also superimpose a digital signal representing pressure and other parameters on the analog loop current using HART, Foundation Fieldbus or other bidirectional digital communication loop protocols known in the process control industry. Alternatively, the transmitter can hold its loop current to a fixed magnitude, such as 4 mA, and a superimposed signal can communicate pressure and other information in a so-called "multidrop" arrangement in which multiple transmitters are connected to one current loop. Transmitter 20 is preferably energized by the loop current I.

The contacts 24, 26 pass through a metal outer connector shell (not illustrated in FIG. 1) that serves as a heat sink for a primary heat load device 40. Primary heat load device 40 can be a bipolar power transistor as illustrated, or can be another type of current controlling device such as an FET or a solid state switch. The primary heat load device 40 conducts and controls a first portion of the loop current I.

The primary heat load device 40 and the connector shell are thermally coupled together and form a thermal island that is a "heat sink island" as explained in more detail below in connection with FIGS. 3–9.

A transmitter conversion circuit 44 couples to pressure sensor 34 and temperature sensor 42 as shown. Conversion circuit 44 calculates a temperature-compensated representation of the pressure at inlet 38. Conversion circuit 44 consumes a second portion of the loop current I in performing these calculations. Conversion circuit 44 also couples to resistor 47 to measure the magnitude of the first portion of the loop current that passes through primary heat load device 40. Conversion circuit 44 provides a control output on line 46 that controls transistor 48 that, in turn, controls primary heat load device 40 so that the total current I is the desired magnitude. Transistor 48 dissipates less heat than primary heat load device 40 and comprises a secondary heat load device. In the case of a 4-20 mA loop, the desired magnitude of current I is a variable analog amount representing the pressure, with or without superimposed digital signals. In the case of a multidrop loop, the desired magnitude of current I is a fixed analog magnitude with digital signals superimposed on the fixed analog magnitude.

Conversion circuit 44 preferably includes an embedded low power MOS microprocessor and a low power MOS Delta-Sigma A/D converter to reduce heat generation.

Transmitter 20 also includes Zener diode 50 that provides reverse polarity protection and transistor 52 that momentarily delays conduction of primary heat load device 40 as power supply 30 is turned on. Conversion circuit 44 and transistor 48 and Zener diode 50 and transistor 52 are arranged on a circuit board (not illustrated in FIG. 1).

As explained in more detail in connection with FIGS. 3–9, the miniature transmitter housing 22 brings the primary heat load device 40 in closer proximity to pressure sensor 34. This closer proximity has the potential to destroy the high accuracy of the transmitter due to thermal warm-up effects. The miniature transmitter housing 22, however, is specially arranged with an outer wall that provides thermal resistance between the heat sink island on one end of the housing and the isothermal island on the other end of the housing. The heat sink island and the isothermal island are thermally separated enough by the outer wall to restore the high accuracy in spite of the close dimensional proximity.

Thermal resistance is enhanced in the outer wall by one or more techniques. The thermal wall is preferably as long as possible along a major axis of the miniature transmitter housing 22. The thermal wall preferably has a thin cross section. The thermal wall is preferably formed of a material that has a relatively low thermal conductivity such as stainless steel alloy or plastic resin. The thermal wall can also include bellows-shaped convolutions to increase its effective thermal length. The thermal wall can also include extended portions that extend outwardly from the outer wall of the transmitter to form fins, pins, splines that have radial or polyhedral shapes to enhance heat flow.

Figure 2:
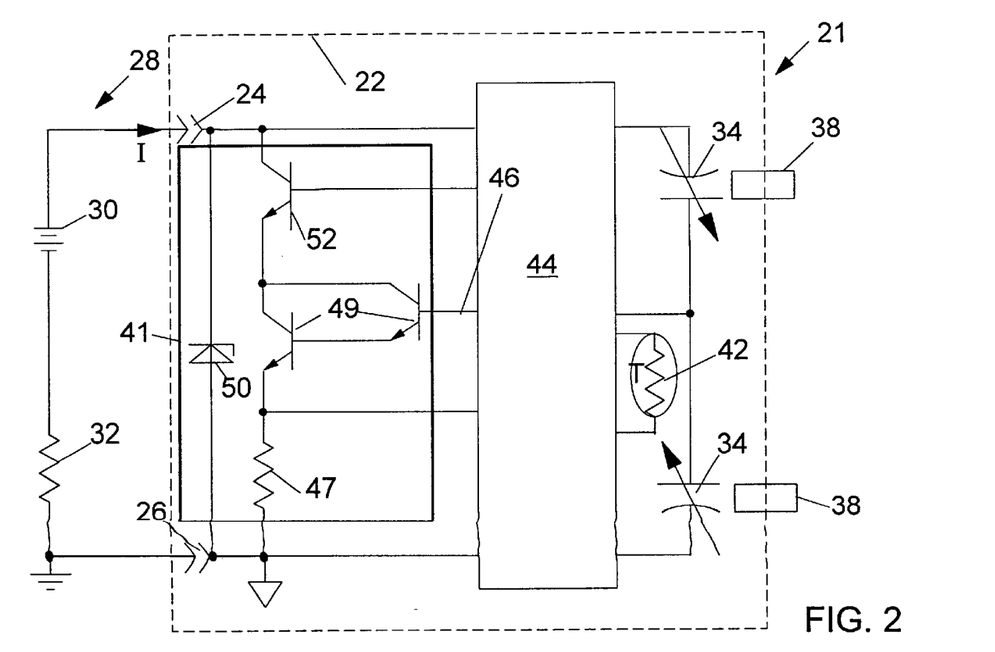
FIG. 2 is a conceptual electrical diagram of a second embodiment of a pressure transmitter.

In FIG. 2, a transmitter 21 is illustrated that is similar to transmitter 20 of FIG. 1, and the same reference numerals are used in both FIGS. 1 and 2 to indicate the same or similar features. In FIG. 2, Zener diode 50, transistor 52, darlington transistor 49 and resistor 47 are included in the primary heat load device 41 that is heat sunk to an electrical connector shell around contacts 24, 26. It will be understood by those skilled in the art that the number of components heat sunk can vary from a single component 40 as illustrated in FIG. 1 up to a larger number of components as illustrated in FIG. 2, depending on the needs of the application.

Figure 3:
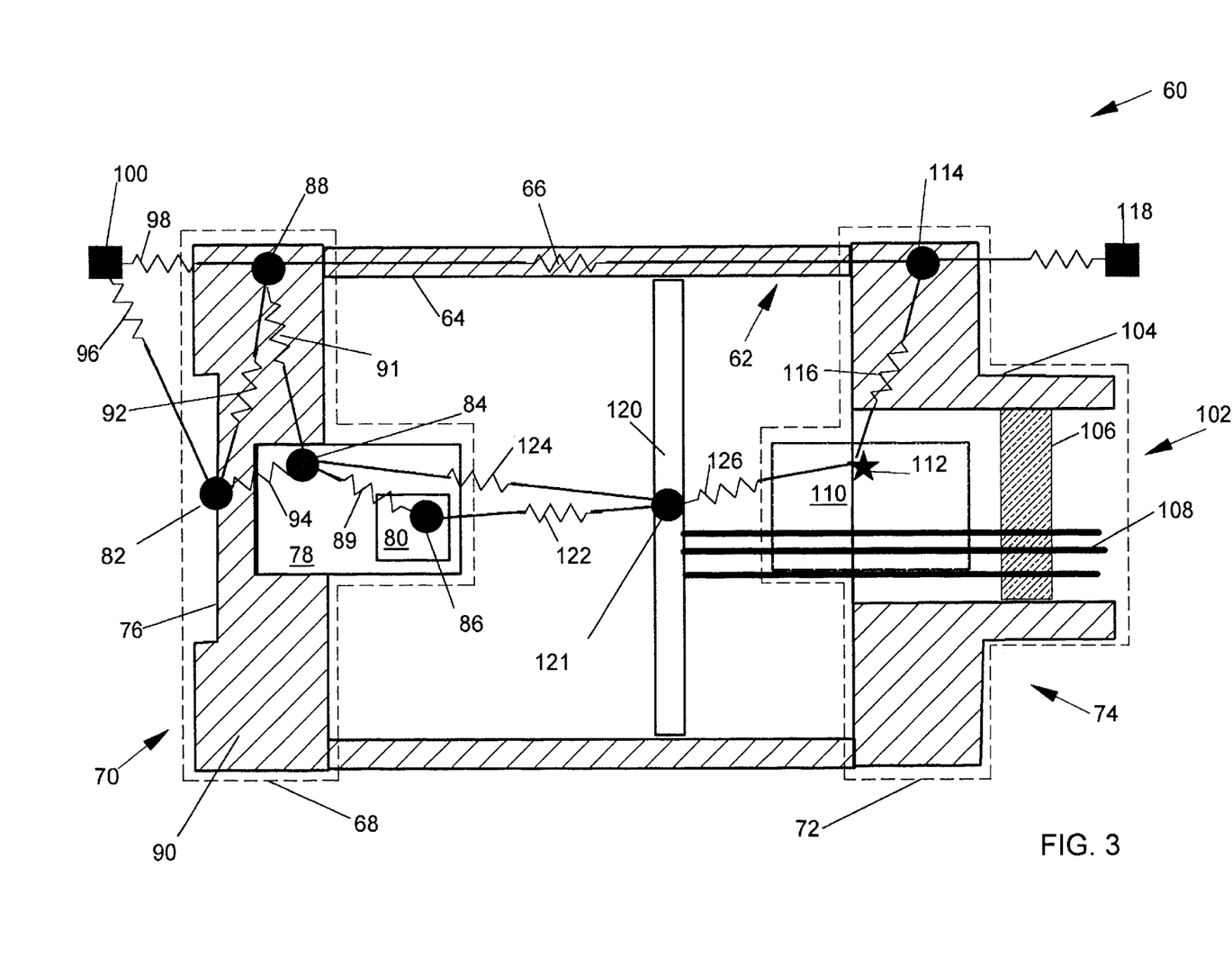
FIG. 3 is a conceptual thermal diagram of a third embodiment of a pressure transmitter.

In FIG. 3, a miniature pressure transmitter 60 is illustrated schematically in cross-section, with thermal nodes (dots, squares, star symbols) and thermal resistances (zig-zag symbols) superimposed over the cross-section to illustrate a discrete thermal model of a miniature transmitter thermal management system. The electrical circuit topologies illustrated in FIGS. 1–2, for example, can be arranged thermally as shown in FIG. 3.

Miniature pressure transmitter 60 has a miniature transmitter housing 62 that includes an outer wall 64 providing a thermal resistance 66. The outer wall 64 separates an isothermal island 68 formed in a first end 70 of the housing 62 from a thermal heat sink island 72 formed in a second end 74 of the housing 62.

The isothermal island 68 includes a fluid inlet 76, a pressure sensor 78 receiving a pressure from the fluid inlet 76 and a temperature sensor 80. The fluid inlet 76 typically includes a fluid isolator diaphragm coupling pressure to pressure sensor 78 via isolator fluid, such as silicone oil. The thermal mass 82 of the inlet 76, the thermal mass 84 of the pressure sensor, the thermal mass 86 of the temperature sensor, and the relatively large thermal mass 88 of a block of metal 90 forming the first end of the miniature housing are all closely coupled together thermally by relatively low thermal resistances 89, 91, 92, 94 to form the isothermal island 68. The components in isothermal island 68 are all at approximately the same temperature, and that temperature is sensed by temperature sensor 80 so that associated circuitry can provide electronic temperature compensation of the output current based on the temperature sensed by temperature sensor 80. Isothermal island 68 is thermally coupled by thermal resistances 96, 98 to a process temperature 100 of the supplied pressurized process fluid. Process temperature 100 can be modeled as a thermal mass with very large or infinite mass relative to the thermal masses of the miniature transmitter. It will be understood by those skilled in the art that the isothermal island 68 can be effectively thermally decoupled or isolated from the process temperature 100 by use of a flange, manifold or remote seal, if needed in a particular application.

The thermal heat sink island 72 includes an electrical connector 102 with an externally threaded outer shell 104 and a feedthrough 106 with contacts 108. Heat sink island 72 also includes a primary heat load device 110 that is heat sunk to the outer shell 104. Two of the contacts 108 carry a current I controlled by the transmitter 60, and a portion of the current I is conducted by the primary heat load device 110. The primary heat load device 110 provides a flow of heat 112 (represented by a star) to the transmitter 60, due to electrical $i^2R$ losses. Heat flow 112 is thermally coupled to a thermal mass 114 of the second end of the miniature transmitter housing 62 by a relatively small thermal resistance 116 to form the heat sink island 72.

Heat sink island 72 is coupled to isothermal island 68 by the thermal resistance 66 of the outer wall that is relatively large, so that the heat sink island 72 is thermally decoupled from the isothermal island 72. The heat sink island 72 is thermally coupled to the ambient temperature 118 so that heat can be dissipated into the ambient environment.

When the transmitter 60 is initially energized after being off for a period of time, the temperature of the heat sink island 72 rises relatively rapidly, but the isothermal island 68 responds slowly and weakly to this change because of the good thermal decoupling provided by outer wall thermal resistance 66.

Transmitter 60 also includes a circuit board 120 that is electrically coupled to the pressure sensor 78 and temperature sensor 80 and to the primary heat load device 110. The circuit board controls the output current I on contacts 108 to provide a temperature-compensated, high accuracy current representation of pressure at the inlet 76. Circuit board 120 has a thermal mass 121 that is coupled to the isothermal island 68 and the heat sink island 72 by relatively large thermal resistances 122, 124, 126. The transmitter 60 can be filled with air, dry nitrogen, or insulating fibers or foam to enhance thermal isolation inside the outer wall 64.

Heat generated in circuit board 120 is conducted to the ambient environment by way of the external wall 64, and convected from the external wall 64 to the ambient environment 118. The heat flow from the circuit board, however, is generally transverse to the external wall 64 and the wall provides relatively good heat conduction in this transverse direction. The external wall 64 is thus arranged for thermal decoupling along its length and good thermal transmission in a transverse direction.

The fluid inlet 76 can also be extended to form a remote seal adapted to receive hot process fluid and the inlet 76 is then thermally isolated from the hot process fluid (not illustrated).

Figure 4:
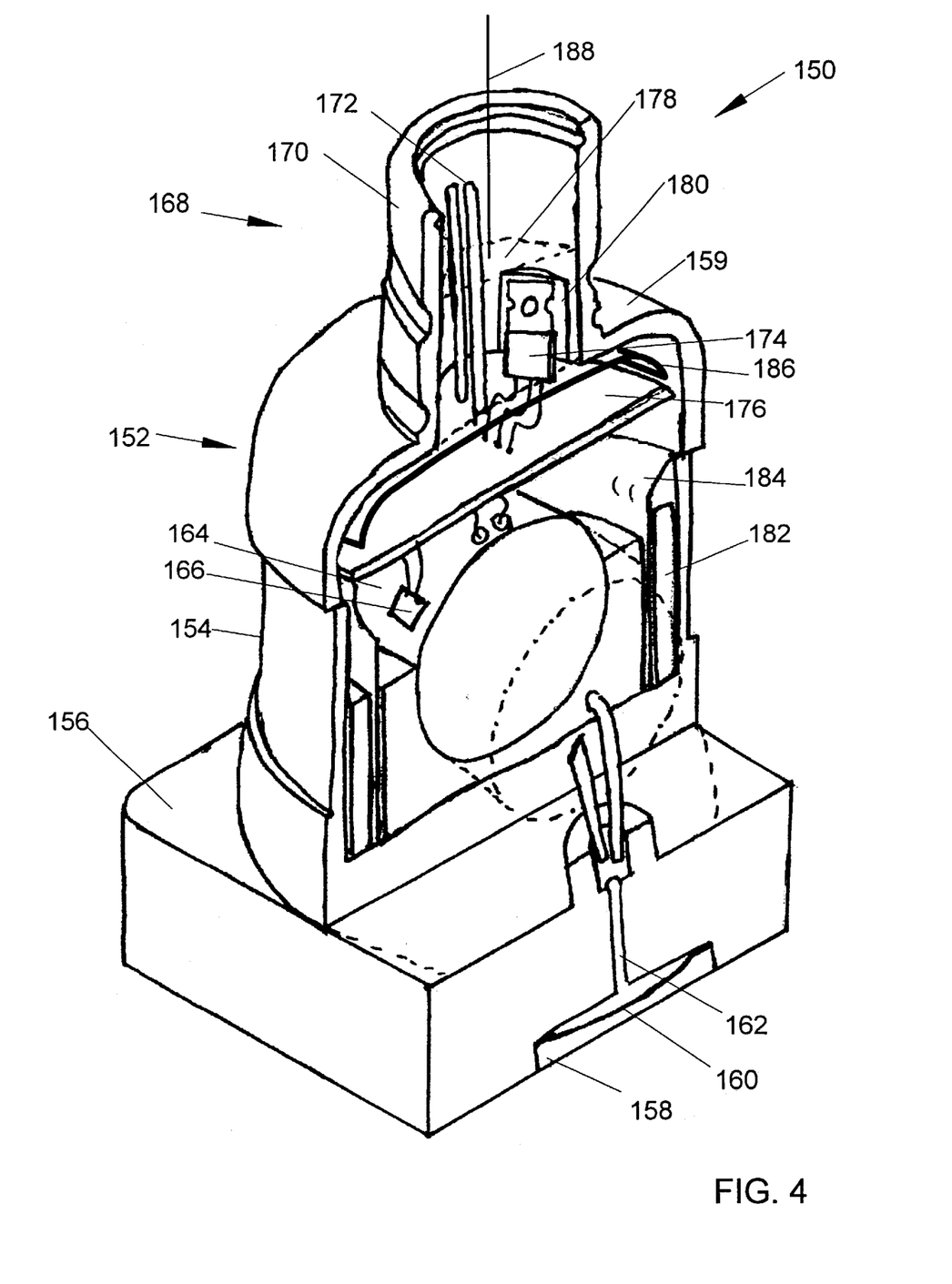
FIG. 4 is an oblique view of a first embodiment of a differential pressure transmitter.

FIG. 4 illustrates an oblique, partially cut-away view of an embodiment of a differential pressure transmitter 150. Transmitter 150 includes a miniature transmitter housing 152 with an outer wall 154 providing thermal resistance. The outer wall 154 separates an isothermal island 156 formed in a first end of the housing from a thermal heat sink island 159 formed in a second end of the housing. The isothermal island 156 includes two coplanar fluid inlets 158 (one of which is hidden from view in FIG. 4) that include isolator diaphragms 160 and isolator fluid 162 sealed in passageways. The isothermal island 156 also includes a capacitive differential pressure sensor 164 receiving differential pressure from the fluid inlet 158. The isothermal island 156 also includes a temperature sensor 166 mounted on the capacitive pressure sensor 164.

The heat sink island 159 includes an electrical connector 168 with a threaded outer shell 170 and a sealed feedthrough with contacts 172, and a primary heat load device 174 that is heat sunk to the outer shell 170. The contacts 172 carry a current controlled by the transmitter 150, and a portion of the current is conducted and controlled by the primary heat load device 174.

A circuit board 176 electrically couples to the pressure sensor 164 and the temperature sensor 166 and to the primary heat load device 174. The circuit board 176 controls the current on contacts 172 to provide a temperature-compensated, high accuracy representation of pressure.

The miniature pressure transmitter 150 also includes thermally conductive potting compound 178 (illustrated in a dashed line) that thermally couples the primary heat load device 174 to the connector shell 170. The thermally conductive potting compound 178 is electrically insulating so that it does not short out pins 172. The primary heat load device 174 is disposed at least partially in the connector shell 170 to enhance heat transfer. If desired, a flat boss or pocket 180 can be formed or adapted inside connector shell 170 to provide good heat transfer to a correspondingly flat heat transfer surface of primary heat load device 174. An electrically insulating layer can be formed on the flat boss or pocket 180 or on the flat heat transfer surface of primary heat load device 174 to provide electrical isolation desirable in intrinsically safe or non-incendive circuits. Heat transfer devices such as ceramic heat spreaders, silicone pads and metal rings can also be used to increase heat transfer.

Thermally insulating potting compound 182 can be disposed in the housing 152 over at least a portion of the first isothermal island 156 as illustrated in FIG. 4. Further, a thermally insulating plastic resin shroud 184 is disposed around at least a portion of the first isothermal island 156. Shroud 184 restricts the flow of heat by convection, conduction or radiation and helps to provide thermal management in the transmitter 150. A thermal shroud 186 is also provided above circuit board 176.

The housing 152 has a central axis 188 extending from the first end to the second end. The circuit board 176 is arranged transverse to the central axis, forming a second isothermal island. The temperatures on the circuit board tend to be more uniform because of the transverse arrangement. Heat flow from sources external to the circuit board tends to be at right angles to the flat surfaces of the circuit board and evenly distributed. The circuit board 176 includes current-carrying conductors having cross-sectional areas at least 1.25 times the cross-sectional areas needed for the currents. The conductors are thermally coupled to a secondary heat load device on the circuit board 176, such as secondary heat load device 48 illustrated in FIG. 1. The increased cross sectional areas of the conductors tends to make the temperatures more uniform across the circuit board 176 and helps to conduct heat away from the secondary heat load device 48. The circuit board conductors are preferably formed of copper, aluminum or silver and can include so called "ground plane" conductors that are included for electrical shielding. The circuit board can also be formed using a ceramic substrate to increase thermal conductivity.

Figure 5:
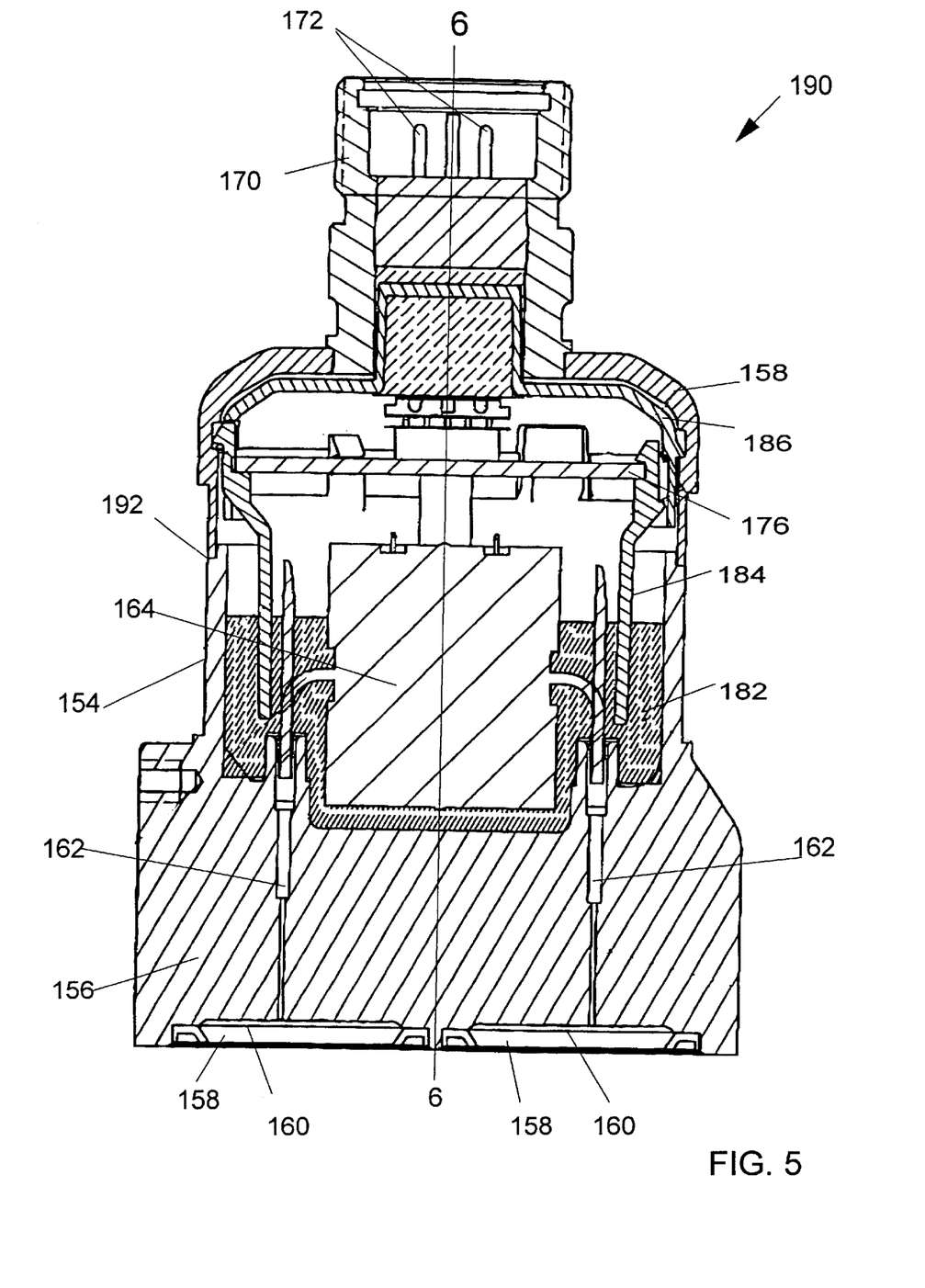
FIG. 5 is a front sectional view of a second embodiment of a differential pressure transmitter.
Figure 6:
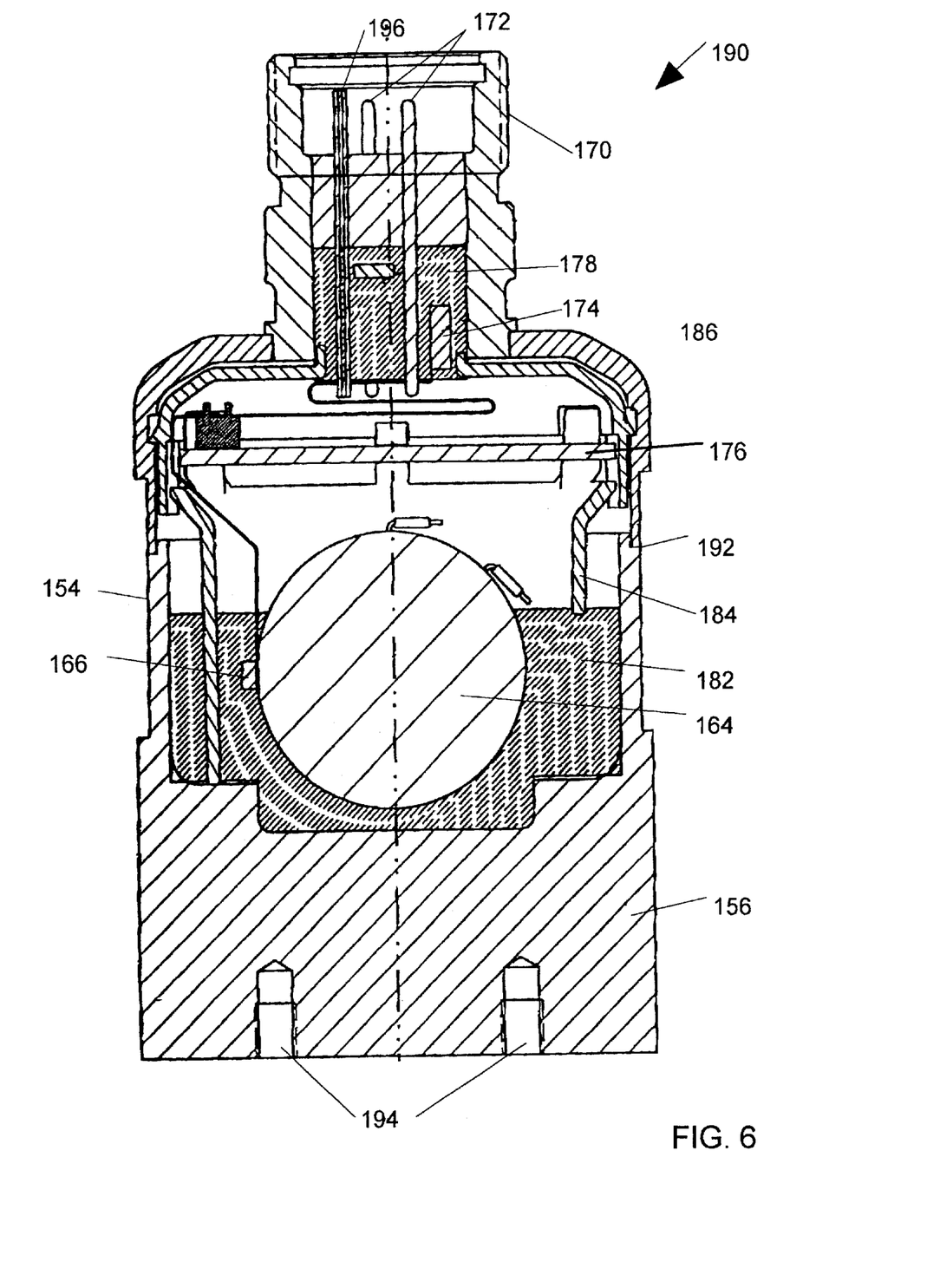
FIG. 6 is a side sectional view taken generally along line 6—6 in FIG. 5.

FIGS. 5–6 illustrate a further embodiment of a differential pressure transmitter 190, with FIG. 6 being a sectional view along line 6—6 in FIG. 5. The differential pressure transmitter 190 illustrated in FIGS. 5–6 is similar to the differential pressure transmitter 150 illustrated in FIG.4, and the same reference numerals are used to identify features in FIGS. 5–6 that are similar or identical to features in FIG. 4. In FIGS. 5–6, the housing is welded together at a weld joint 192. The circuit board 176 snaps in place inside the shrouds 184, 186 and the shrouds 184, 186 serve as an alignment device for aligning housing parts prior to and during welding. Bolt holes 194 are provided for bolting a flange, manifold or remote seal to the coplanar inlets 158 on the base of the transmitter. The threaded fitting 170 serves as a support for adding an optional wiring housing (not illustrated here) to the transmitter 190. The optional wiring housing can serve to radiate heat that is heat sunk into the connector shell 170 into the ambient environment. A tube 196 is provided in the electrical feedthrough connector for testing for leaks prior to sealing the tube to provide a hermetically sealed miniature differential high accuracy pressure transmitter 190.

Figure 7:
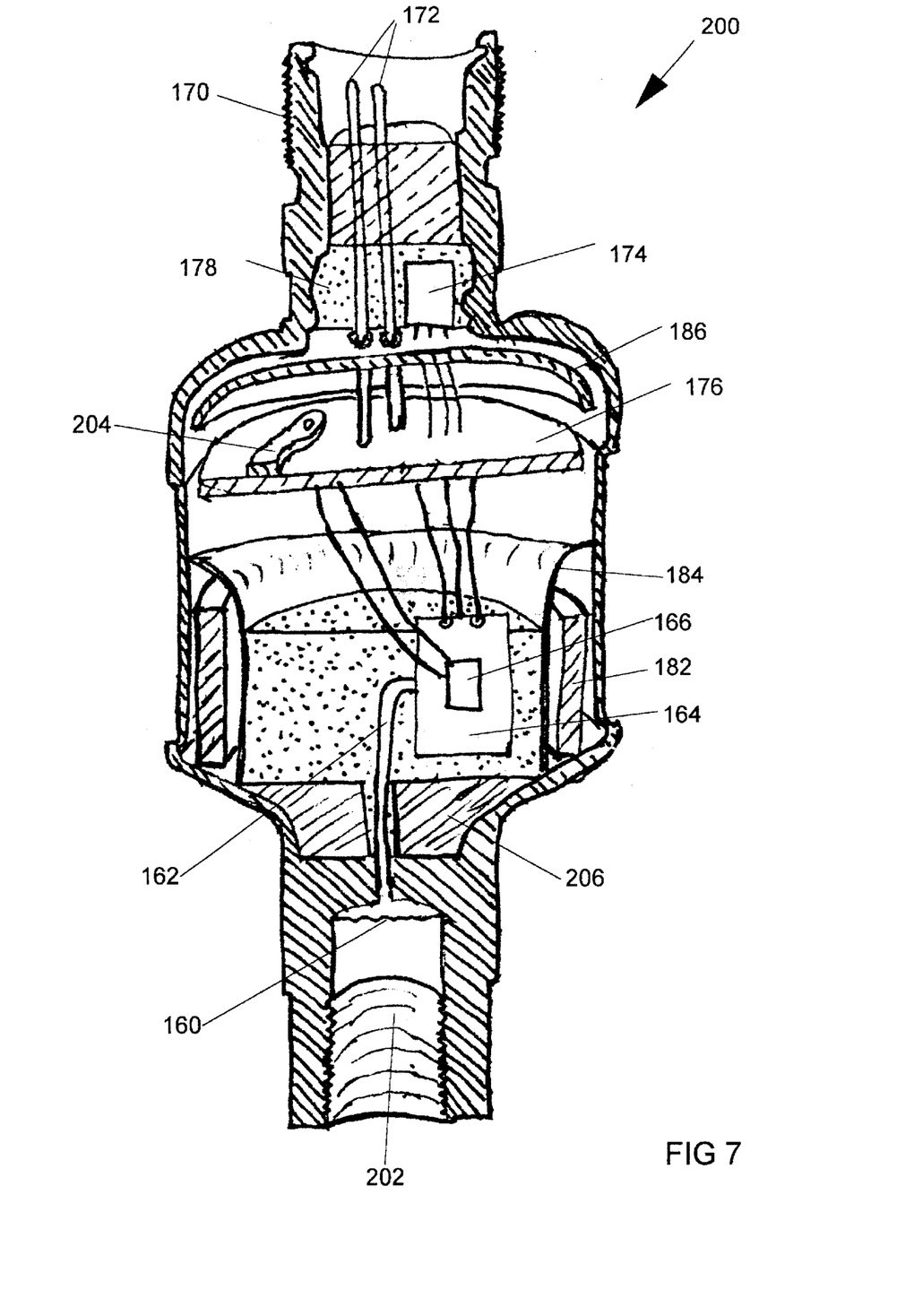
FIG. 7 is an oblique view of a first embodiment of a single inlet pressure transmitter.

FIG. 7 illustrates an oblique cutaway view of an embodiment of a miniature pressure transmitter 200 with a single threaded process fluid inlet 202. Pressure transmitter 200 can sense either absolute pressure (AP) or gauge pressure (GP) at inlet 202. The single inlet pressure transmitter 200 illustrated in FIG. 7 is similar to the differential pressure transmitter 150 illustrated in FIG. 4, and the same reference numerals are used to identify features in FIG. 7 that are similar or identical to features in FIG. 4. Circuit board 176 includes printed circuit conductors 204 which have an increased thickness beyond circuit ampacity requirements to provide enhanced thermal conductivity on the circuit board as explained above. Transmitter 200 also includes a metal "spike" 206 which is formed of material with high thermal conductivity such as copper and reduces thermal resistances between the pressure sensor 164 and the isolator diaphragm 160. Metal spike 206 helps to form an isothermal island at the lower end of the transmitter 200.

Figure 8:
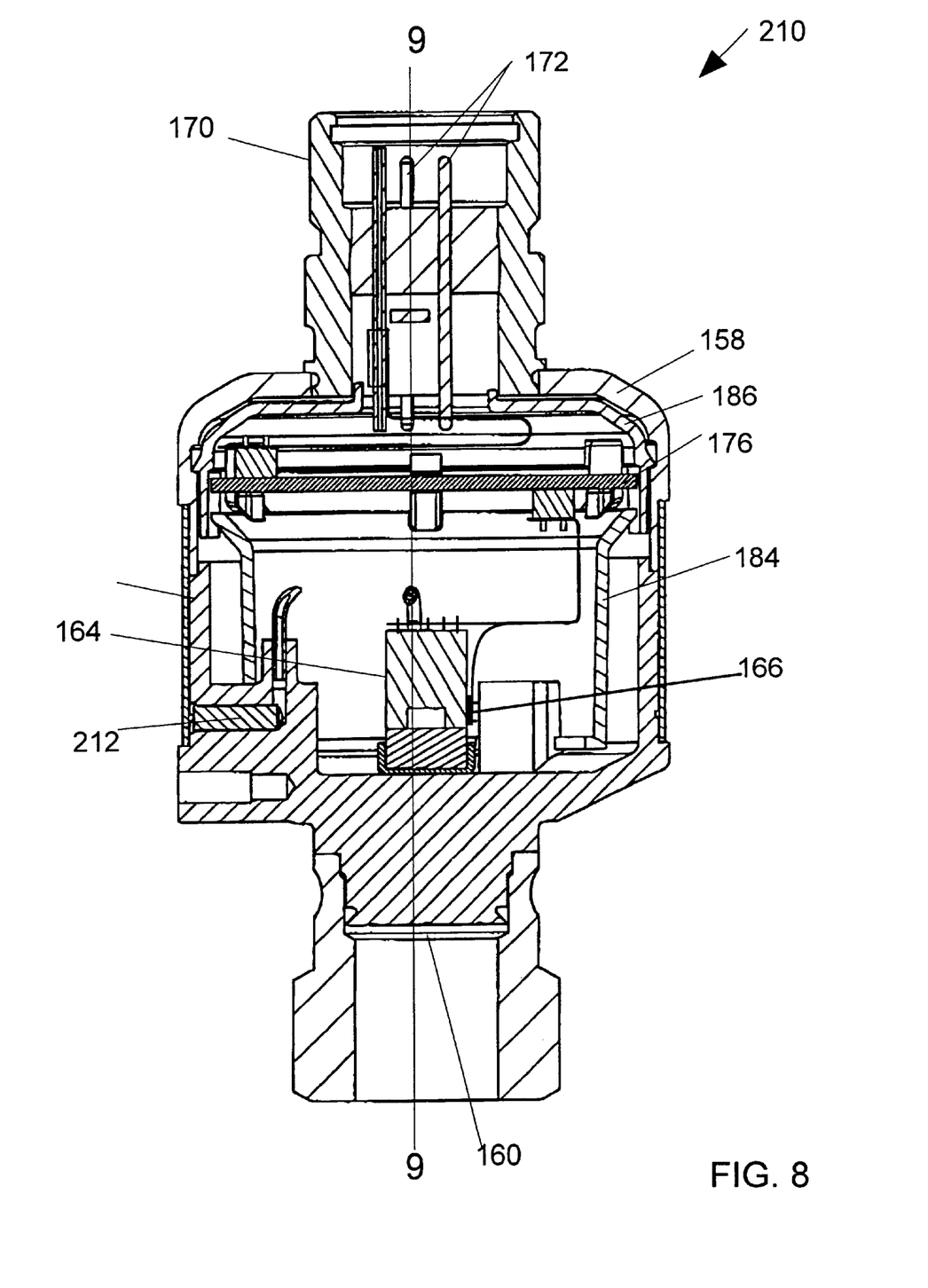
FIG. 8 is a front sectional view of a second embodiment of a single inlet pressure transmitter.
Figure 9:
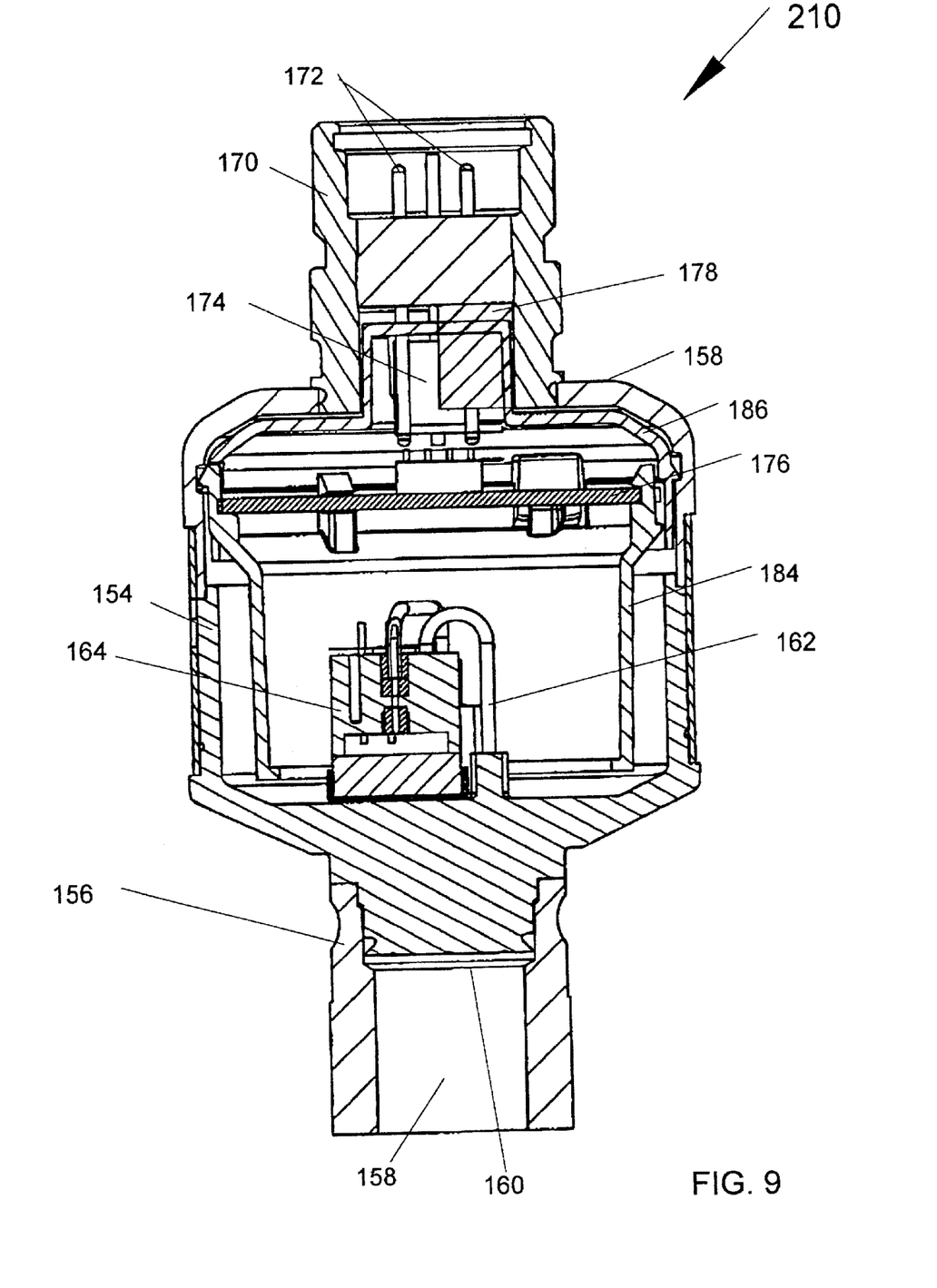
FIG. 9 is a side sectional view taken generally along line 9—9 in FIG. 8.

FIGS. 8–9 illustrate a gauge pressure embodiment of a single process inlet pressure transmitter 210, with FIG. 9 being a sectional view generally along line 9—9 in FIG. 8. The single process inlet, gauge pressure transmitter 210 illustrated in FIGS. 8–9 is similar to the transmitter 200 illustrated in FIG. 7, and the same reference numerals are used to identify features in FIGS. 8–9 that are similar or identical to features in FIGS. 4–7. As illustrated in FIG. 8, transmitter 210 includes a vent 212 that is coupled to the "back side" of pressure sensor 164 of FIGS. 8–9 so that gauge pressure can be measured.

Figure 10:
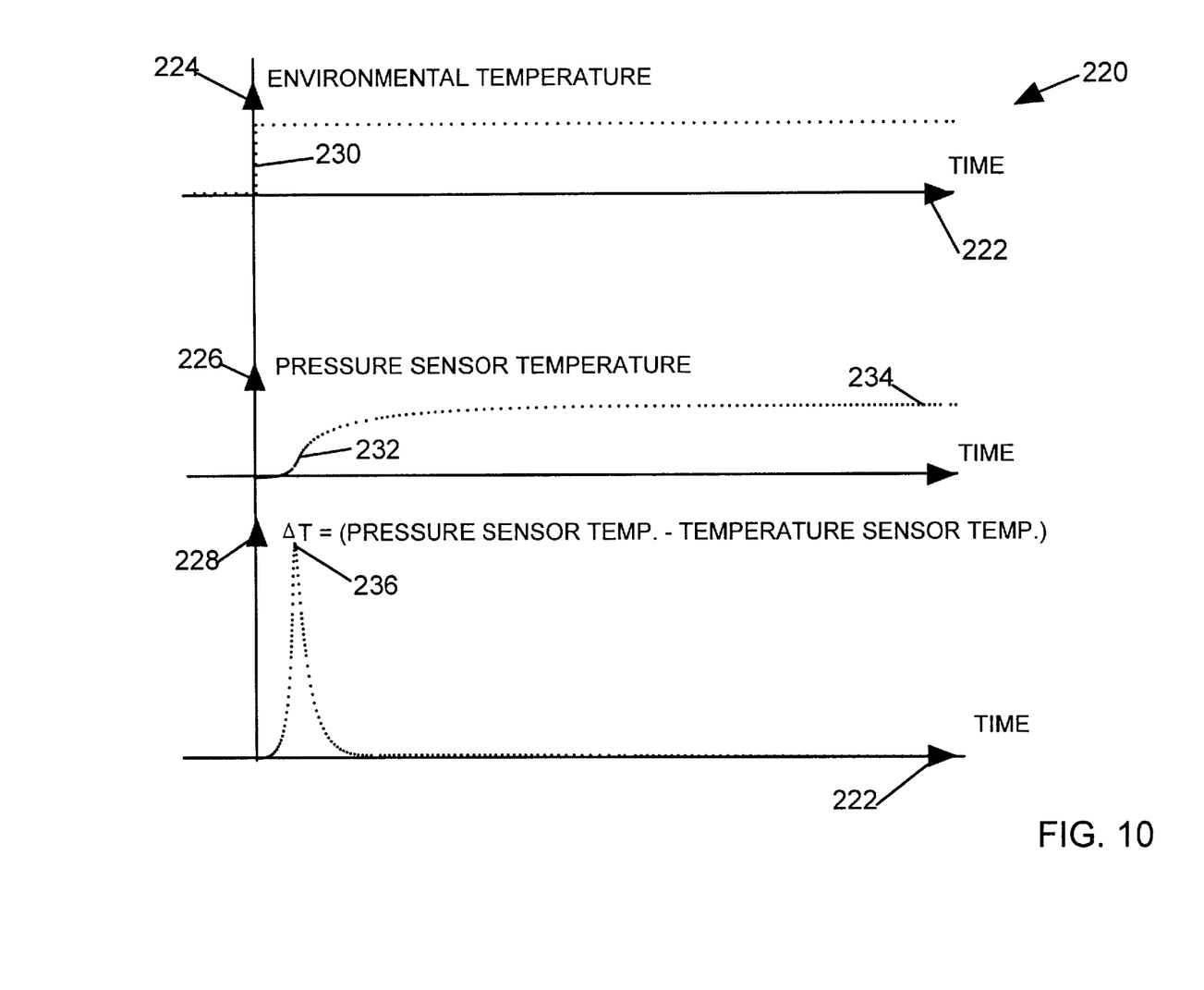
FIG. 10 illustrates temperature tracking of a temperature sensor.

FIG. 10 illustrates a timing diagram 220 of temperature tracking for a temperature sensor (such as temperature sensor 42, 80 or 166) mounted on a pressure sensor (such as pressure sensor 34, 78, or 164). In timing diagram 220, the horizontal axes 222 represent time. Vertical axis 224 represents the environmental temperature around a transmitter. Vertical axis 226 represents a temperature of a pressure sensor inside the transmitter. Vertical axis 228 represents a temperature difference between the temperature of the pressure sensor and a temperature of a temperature sensor that is mounted on the pressure sensor. At time t=0, a 10 degree centigrade shift in environmental temperature takes place abruptly at 230. The temperature of the pressure sensor responds to this abrupt change as shown at 232 and increases slowly, and eventually achieves the same 10 degree centigrade shift in temperature as shown at 234. The temperature sensor, however, has an extremely small thermal mass in comparison to the thermal mass of the pressure sensor. The temperature sensor is in close thermal contact with the pressure sensor. The temperature sensor tracks the temperature of the pressure sensor very closely. As shown at 236, there is a very short time interval during which the temperature difference increases slightly. The maximum peak of the temperature difference at 236 is on the order of about 0.1 degrees centigrade. Keeping the peak small helps to ensure good transient thermal performance of the transmitter because temperature compensation can be performed accurately even during transient temperature events.

Although the present invention has been described with reference to preferred embodiments, workers skilled in the art will recognize that changes may be made in form and detail without departing from the spirit and scope of the invention. Pressure sensors other than capacitive pressure sensors can be used, for example, resistive strain gages. In some cases, a single sensor will provide both a pressure and a temperature output. Features illustrated in one embodiment can be appropriately adapted to other illustrated embodiments.

What is claimed is:

1. A miniaturized pressure transmitter, comprising:
   at least first and second thermal islands in a single housing that thermally separate a pressure sensor in the first thermal island from a heat generating electronic circuit included in the second thermal island;
   wherein the first thermal island includes a fluid inlet, a pressure sensor configured to receive a pressure from the fluid inlet, and a temperature sensor sensing the temperature of the pressure sensor; and
   wherein the second thermal island includes an electrical connector with an outer shell and a feedthrough with contacts, and a primary heat load device that is thermally coupled to the outer shell, the contacts configured to connect the transmitter to an external current loop circuit and to carry a transmitter output current, and a portion of the transmitter output current is conducted by the primary heat load device.

2. The miniaturized pressure transmitter of claim 1 further comprising thermally conductive potting compound thermally coupling the primary heat load device to the outer shell.

3. The miniaturized pressure transmitter of claim 2 wherein the thermally conductive potting compound is electrically insulating.

4. The miniaturized pressure transmitter of claim 1 wherein the primary heat load device is disposed at least partially in the outer shell.

5. The miniaturized pressure transmitter of claim 4 further comprising a flat boss formed inside the outer shell and having an electrically insulating and thermally conductive flat layer thereon, the flat layer mating with a correspondingly flat surface on the primary heat load device.

6. The miniaturized pressure transmitter of claim 1 further comprising a pocket formed in the outer shell, the pocket having a shape adapted to receive the primary heat load device.

7. The miniaturized pressure transmitter of claim 1 wherein the primary heat load device is thermally coupled to the outer shell by a heat transfer device selected from the group of thermally conductive potting compound, ceramic heat spreaders, silicone pads and metal rings.

8. The miniaturized pressure transmitter of claim 1 further comprising thermally insulating potting compound disposed in the housing over at least a portion of the first thermal island.

9. The miniaturized pressure transmitter of claim 1 further comprising a thermally insulating plastic resin shroud disposed around at least a portion of the first thermal island.

10. The miniaturized pressure transmitter of claim 1 wherein the housing has a central axis extending from a first end to a second end and the electronic circuit includes a circuit board that is arranged transverse to the central axis.

11. The miniaturized pressure transmitter of claim 10 wherein the circuit board includes a secondary heat load device.

12. The miniaturized pressure transmitter of claim 11 wherein the circuit board includes current-carrying conductors having cross-sectional areas at least 1.25 times the cross-sectional areas needed for the currents, and the conductors are thermally coupled to the secondary heat load device.

13. The miniaturized pressure transmitter of claim 11 wherein the circuit board includes a ceramic substrate.

14. The miniaturized pressure transmitter of claim 1 wherein the transmitter includes a secondary heat load device disposed on the circuit board.

15. The miniaturized pressure transmitter of claim 1 wherein the transmitter output current is a 4–20 mA loop current that energizes the miniaturized pressure transmitter.

16. The miniaturized pressure transmitter of claim 1 wherein the pressure transmitter is a multidrop transmitter and the transmitter output current includes a fixed energization current component and a superimposed digital current component, the superimposed digital component representing the pressure.

17. The miniaturized pressure transmitter of claim 1 wherein the housing is formed of a stainless steel alloy.

18. The miniaturized pressure transmitter of claim 17 wherein the housing has an increased thickness at first and second ends and has a decrease thickness along an integral wall.

19. The miniaturized pressure transmitter of claim 1 wherein the housing further includes external heat removers that are surfaces extending outwardly from the transmitter.

20. The miniaturized pressure transmitter of claim 1 wherein the inlet is a remote seal adapted to receive hot process fluid and the inlet is thermally isolated from the hot process fluid.

21. The miniaturized pressure transmitter of claim 1 wherein the inlet includes a fluid isolator.

22. A miniaturized pressure transmitter, comprising:

a transmitter housing with an outer wall providing thermal resistance, the outer wall separating an isothermal island formed in a first end of the housing from a heat sink island formed in a second end of the housing;

the isothermal island including a fluid inlet, a pressure sensor configured to receive a pressure from the fluid inlet and a temperature sensor;

the heat sink island including an electrical connector with an outer shell and a feedthrough with contacts, and a primary heat load device that is thermally coupled to the outer shell, the contacts configured to connect the transmitter to an external current loop circuit and to carry a current controlled by the transmitter, and a portion of the current being conducted by the primary heat load device; and a circuit board electrically coupled to the pressure and temperature sensors and to the primary heat load device, the circuit board configured to control the current to provide a temperature-compensated, high accuracy representation of pressure.

23. The miniaturized pressure transmitter of claim 22 wherein the primary heat load device is disposed at least partially in the connector shell.

24. The miniaturized pressure transmitter of claim 23 further comprising a flat boss formed inside the connector shell and having an electrically insulating and thermally conductive flat layer thereon, the flat layer mating with a correspondingly flat surface on the primary heat load device.

25. The miniaturized pressure transmitter of claim 22 further comprising a thermally insulating plastic resin shroud disposed around at least a portion of the first isothermal island.

26. The miniaturized pressure transmitter of claim 22 wherein the housing has a central axis extending from the first end to the second end and the circuit board is arranged transverse to the central axis, forming a second isothermal island.

27. The miniaturized pressure transmitter of claim 26 wherein the circuit board includes a secondary heat load device.

28. The miniaturized pressure transmitter of claim 27 wherein the circuit board includes current-carrying conductors having cross-sectional areas at least 1.25 times the cross-sectional areas needed for the currents, the conductors being thermally coupled to the secondary heat load device.

29. The miniaturized pressure transmitter of claim 22 wherein the transmitter includes a secondary heat load device disposed in the second isothermal island.

30. The miniaturized pressure transmitter of claim 22 wherein the controlled current output is a 4–20 mA loop current that energizes the miniaturized pressure transmitter.

31. The miniaturized pressure transmitter of claim 22 wherein the pressure transmitter is a multidrop transmitter and the controlled current includes a fixed energization current component and a superimposed digital current component, the superimposed digital component representing the pressure.

32. The miniaturized pressure transmitter of claim 22 wherein the housing is formed of a stainless steel alloy.

33. A miniaturized pressure transmitter, comprising:

an outer housing having a fluid inlet at a first end, an electrical feedthrough with contacts and an outer connector shell at a second end, the contacts configured to couple the transmitter to an external current loop, and an integral outer wall extending between the inlet and the connector shell, the housing having a central axis extending from the first end to the second end;

a transducer disposed in the housing having a pressure sensor fluidly coupled to the inlet and a temperature sensor, the pressure sensor being in thermal contact with the fluid inlet and the temperature sensor;

a circuit board electrically coupled to the transducer and having a controlled current output that is coupled to the contacts and that represents the pressure, the circuit board being arranged transverse to the central axis; and a transistor that conducts a portion of the controlled current and that is thermally coupled to the connector shell, the integral wall having a length sufficient to thermally decouple the transducer from the transistor.

* * * * *